US012582993B2

(12) United States Patent
Yakabe et al.

(10) Patent No.: US 12,582,993 B2
(45) Date of Patent: Mar. 24, 2026

(54) ELECTRICALLY-DRIVEN STONE MATERIAL CRUSHING TOOL

(71) Applicant: MAKITA CORPORATION, Anjo (JP)

(72) Inventors: Koichi Yakabe, Anjo (JP); Hiroki Ikuta, Anjo (JP); Toshihito Yabunaka, Anjo (JP)

(73) Assignee: MAKITA CORPORATION, Anjo (JP)

(*) Notice: Subject to any disclaimer, the term of this patent is extended or adjusted under 35 U.S.C. 154(b) by 298 days.

(21) Appl. No.: 18/265,501

(22) PCT Filed: Oct. 25, 2021

(86) PCT No.: PCT/JP2021/039225
§ 371 (c)(1),
(2) Date: Jun. 6, 2023

(87) PCT Pub. No.: WO2022/137773
PCT Pub. Date: Jun. 30, 2022

(65) Prior Publication Data

US 2024/0024882 A1 Jan. 25, 2024

(30) Foreign Application Priority Data

Dec. 25, 2020 (JP) ................................. 2020-217714

(51) Int. Cl.
*B02C 1/06* (2006.01)
*E04G 23/08* (2006.01)

(52) U.S. Cl.
CPC ..................................... *B02C 1/06* (2013.01)

(58) Field of Classification Search
CPC ................................ B02C 1/06; E04G 23/082
See application file for complete search history.

(56) References Cited

U.S. PATENT DOCUMENTS

| | | | | |
|---|---|---|---|---|
| 2015/0014454 | A1 | 1/2015 | Sutti et al. | |
| 2018/0304454 | A1 | 10/2018 | Kawakami et al. | |
| 2019/0314888 | A1* | 10/2019 | Ikuta | B21J 15/36 |
| 2020/0052550 | A1 | 2/2020 | Shimizu | |

FOREIGN PATENT DOCUMENTS

| | | | |
|---|---|---|---|
| JP | S52-152173 | U | 11/1977 |
| JP | S59-35550 | U | 3/1984 |
| JP | S59-154334 | U | 10/1984 |

(Continued)

OTHER PUBLICATIONS

English translate (JPS5935550U), retrieved date Jun. 26, 2025.*

(Continued)

*Primary Examiner* — Mohammed S. Alawadi
(74) *Attorney, Agent, or Firm* — Oliff PLC

(57) ABSTRACT

To provide a construction technique of a stone material crushing tool which can prevent complication of working environment. An electrically-driven stone material crushing tool including a motor having an output shaft, a motion converting mechanism to convert a rotating movement from the output shaft to a linear movement, and a crushing member to crush the stone material by clamping by means of the linear movement of the motion converting mechanism.

9 Claims, 5 Drawing Sheets

(56) References Cited

FOREIGN PATENT DOCUMENTS

| | | | |
|---|---|---|---|
| JP | S61-025449 | U | 2/1986 |
| JP | S64-042878 | U | 3/1989 |
| JP | H03-027174 | U | 3/1991 |
| JP | H10-110542 | A | 4/1998 |
| JP | 2004-195402 | A | 7/2004 |
| JP | 2014-121662 | A | 7/2014 |
| JP | 2018-071687 | A | 5/2018 |
| JP | 2018-183822 | A | 11/2018 |
| JP | 2019-118325 | A | 7/2019 |

OTHER PUBLICATIONS

Holmatro Concrete Crusher CC 20 C HD.wmv, retrieved date Jun. 26, 2025. https://www.youtube.com/watch?v=THGbnTE7sDQ.*
Jan. 11, 2022 International Search Report issued in International Patent Application No. PCT/JP2021/039225.
Jun. 13, 2023 International Preliminary Report on Patentability issued in International Patent Application No. PCT/JP2021/039225.
Jul. 23, 2024 Office Action issued in Japanese Patent Application No. 2020-217714.
Jul. 29, 2025 Office Action issued in Chinese Patent Application No. 202180087058.2.

* cited by examiner

ELECTRICALLY-DRIVEN STONE MATERIAL CRUSHING TOOL

TECHNICAL FIELD

This disclosure relates to an electrically-driven stone material crushing tool.

BACKGROUND OF THE INVENTION

An example of a stone material crushing tool is disclosed in Japanese Utility model Publication H3-27174. This stone material crushing tool includes a crushing member which crushes the stone material by clamping it and a hydraulic cylinder to drive the crushing member. As the stone material, for example, a concrete architecture is provided. In order to crush such stone material, relatively strong crushing force is required. In this respect, in order to secure strong crushing force by the hydraulic cylinder, it is necessary to provide with a compressor to supply pressurized fluid to the hydraulic cylinder, an electric device to drive the compressor, a hose to transfer the pressurized fluid by connecting the compressor and the hydraulic cylinder, and so on, while it is not indicated in figures of this patent reference. As a result, it becomes problematic that working environment tends to be complicated.

PRIOR ART REFERENCE

Patent Reference

Patent Reference 1

Japanese Utility model Publication H3-27174

SUMMARY OF THE INVENTION

Object to be Achieved by the Invention

The object of the invention is to provide a construction technique of a stone material crushing tool in which complication of a working environment can be avoided.

Embodiment to Achieve the Object

In order to achieve the above-explained object, an electrically-driven stone material crushing tool is provided according to one aspect of this disclosure.

The stone material crushing tool comprises a motor with an output shaft, a motion converting mechanism which converts rotating output from the output shaft to linear movement and a crushing member which clamps the stone material to crush by means of the linear movement by the motion converting mechanism.

As to the "stone material", it may broadly comprise, for example, concrete, natural stone, artificial stone and so on.

Further, as to "clamp to crush" of the stone material, any one of or combination of aspects may be embraced such like, crushing by pressure from both sides, cutting by using a pair of blades opposing to each other, crushing by shear force and so on.

According to the above-explained stone material crushing tool, different from conventional hydraulic device, it is not necessary to prepare a compressor and a pressurized fluid transferring hose by electrically driving the crushing member and thus, simplification and compact sizing of the working environment can be realized.

As one aspect of this invention, the motion converting mechanism is defined by a screw feed mechanism comprising a screw portion, a nut portion screwed to the screw portion. Typically, a ball screw shaft mechanism represents such mechanism.

By adopting the screw feed mechanism, big torque can effectively be converted to linear movement and durability of the tool can also be enhanced, while securing power transmission for the stone material crushing operation.

As one aspect of this invention, the output shaft is arranged to be connected with the screw portion side such that the nut portion linearly moves along the screw portion by the rotating movement of the screw portion. As to the connection with the screw portion, it does not exclude the case that other functional component is intervened between the output shaft and the screw portion.

Because the nut portion performs the linear movement as a driven-side member to move along the screw portion, the size of the moving members of the movable component can be within the size of the screw portion such that the housing structure can be prevented from becoming large size and countermeasure against dust can easily be done.

As one aspect of this invention, the crushing member comprises a stone material clamping portion which clamps the stone material in a predetermined clamping direction such that the linear movement of the motion converting mechanism coincides with the clamping direction.

Because the linear movement direction of the motion converting mechanism coincides with the clamping direction, entire length of the stone material crushing tool in the longitudinal direction (direction crossing with the clamping direction) can become compact.

Note that, as to "linear movement direction" and "clamping direction", it is not necessarily required to have geometrically linear movement or linear direction in a strict manner, it is enough to have linear movement component or approximate linear movement.

As one aspect of this invention, the extending direction of the output shaft coincides with the clamping direction.

By constructing the motor disposition such that the extending direction of the output shaft coincides with the clamping direction, the entire length of the tool in the longitudinal direction can further become compact.

As one aspect of this invention, a rotating movement converting mechanism which converts the linear movement of the motion converting mechanism to a rotating movement is further provided, such that the crushing member crushes the stone material by the rotating movement of the rotating movement converting mechanism.

The rotating movement converting mechanism and the crushing member can be arranged to be a unified (single) component structure.

Further, when the rotating movement converting mechanism transforms the movement, crushing force may further be increased by utilizing a lever.

As one aspect of this invention, a position detecting member which detects a predetermined first position and a second position during the crushing operation, and a controller which controls the motor drive based on the detection result of the position detecting member may further be provided.

Typically, an operation starting position may be allocated as the first position and an operation terminating position may be allocated as the second position. For example, the stone material crushing operation is started from the first position and then, when the second position is detected, the motor is reversely driven to return to the initial position.

In view of the detection easiness and certainty, the first position and the second position may preferably be arranged on the linear movement part of the motion converting mechanism.

Otherwise, by setting a predetermined reference position, the drive control can be made based on the number of rotations of the motor (historical data as to how many numbers of rotations the motor has performed).

As one aspect of this invention, the disposition of at least any one of the first position and the second position is changeable.

Typically, the disposition can be changed by a manual operation of the user according to the working environment. For example, the initial position can be changed by changing the disposition of the first position as the operation starting position. Otherwise, the working stroke can be changed by changing the relative distance between the first position and the second position as the maximum movable position.

Further, the disposition may automatically be changed according to the material or the size of the stone material.

As one aspect of this invention, a crushing detecting member of the stone material is further provided and the motor drive is conducted based on the detection result of the crushing detecting member.

This aspect can be arranged by combining with the position detecting portion as explained above or solely by the crushing detecting member only. When the crushing is detected, the motor is controlled to be driven and for example, returned to the initial position. If combined with the position detecting portion, for example, the first position is allocated to the initial position and the second position is allocated to the maximum working position. At the crushing detecting member, when the crushing of the stone material is detected before reaching the second position (corresponding to a case that the crushing is completed under the condition as the clamping amount of the stone material is relatively small), the retuning operation to the initial position is possible before reaching the second position. As a result, the working stroke can become short and working efficiency can be enhanced.

Note that “crushing” of “crushing detection” may embrace an aspect that the stone material is completely crushed to be separated and other aspect, for example, that the crushing member only penetrate the stone material.

Further, “detection” may be appropriately done by selectively checking the parameter fluctuation, for example, of motor driving current, motor driving voltage, motor output torque, battery current, battery voltage, torque at the power transmission path, axial force and so on. Otherwise, detection may be done based on the operation monitoring of the crushing member.

Having regard to the easiness and preciseness of the detecting mechanism, it may be preferable to detect the crushing based on the torque or the axial force on the power transmission path.

As one aspect of this invention, a planetary gear deceleration mechanism is disposed to intervene between the output shaft and the motion converting mechanism.

By using the planetary gear deceleration mechanism, the device construction for the speed reduction can become compact.

As one aspect of this invention, a handle to be held by the user and a battery to drive the motor are further provided, such that the battery is disposed in a handle adjacent region and the handle concurrently serves as a battery guard.

By adopting battery for the electricity supply, further easiness of the working environment is possible. The battery may preferably be detachable. Further, by allocating the handle also to the battery guard, rational usage of the component member can be made.

According to the invention, a construction technique is provided with a stone material crushing tool in which complication of a working environment can be prevented.

REPRESENTATIVE EMBODIMENT TO EXPLOIT THE INVENTION

Hereinafter, in reference to FIG. 1 to FIG. 5, a stone material crushing tool 101 according to the representative embodiment is explained.

This stone material crushing tool 101 is an example of “stone material crushing tool” according to the invention.

Figure 1:
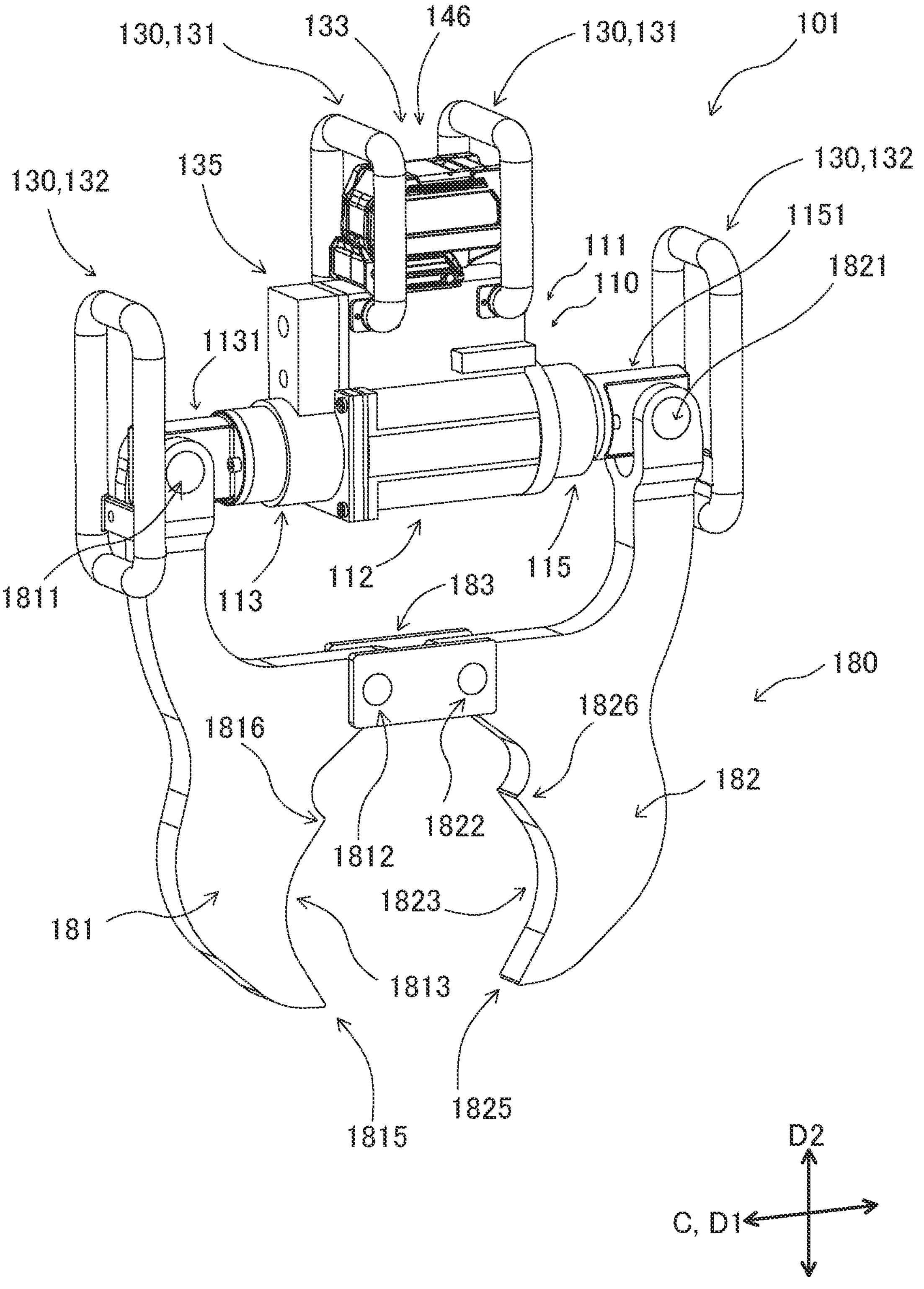
FIG. 1 is a schematic view showing the entire structure of the stone material crushing tool according to the embodiment.
Figure 2:
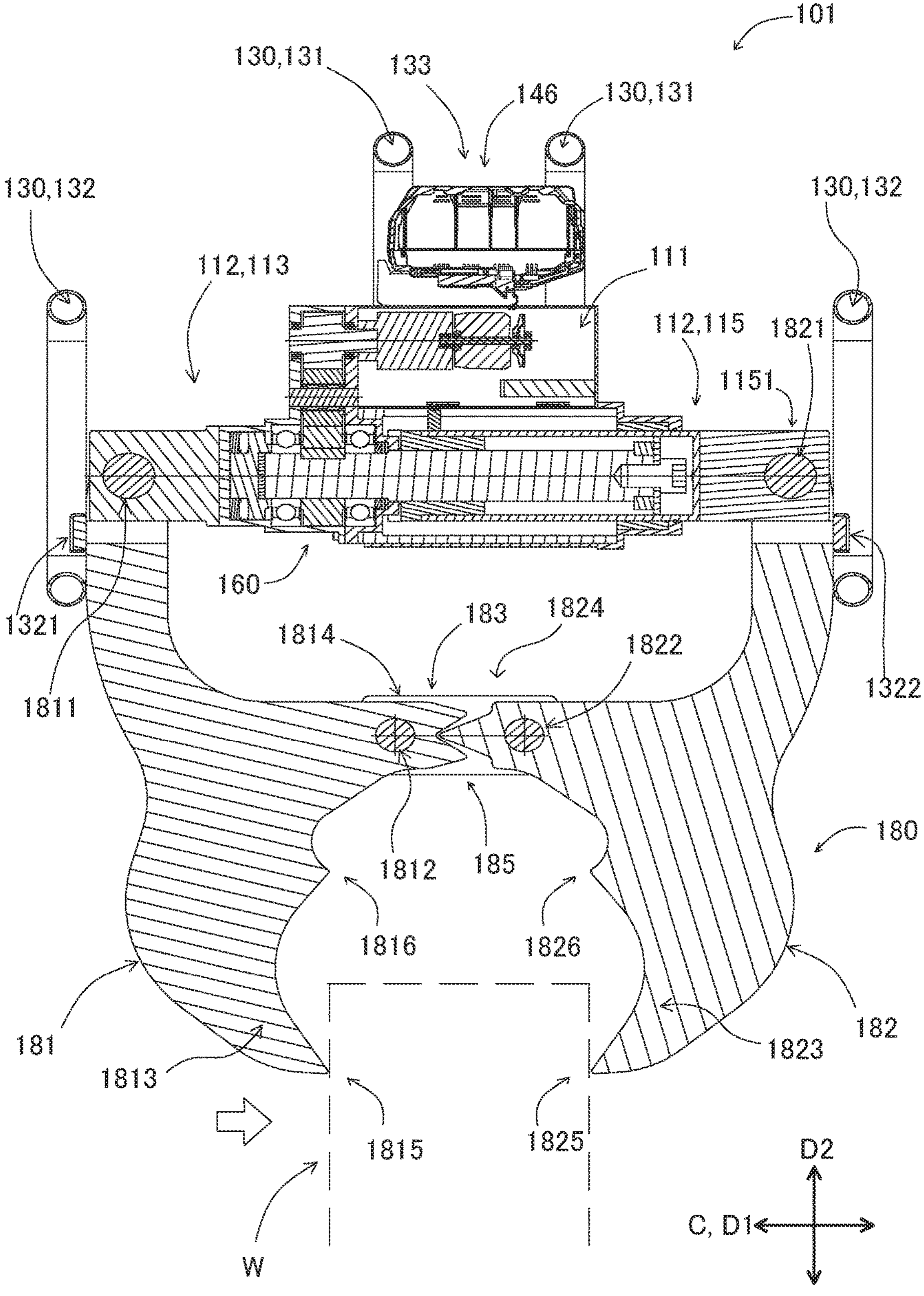
FIG. 2 is a front cross-sectional view of the stone material crushing tool.

FIG. 1 shows an entire structure of the stone material crushing tool 101 as a perspective view. Further, FIG. 2 shows an entire structure of the stone material crushing tool 101 as a front cross-sectional view. Further, FIG. 3 shows a detailed structure of the stone material crushing tool 101 at its upper region as a partly cross-sectional view.

Figure 3:
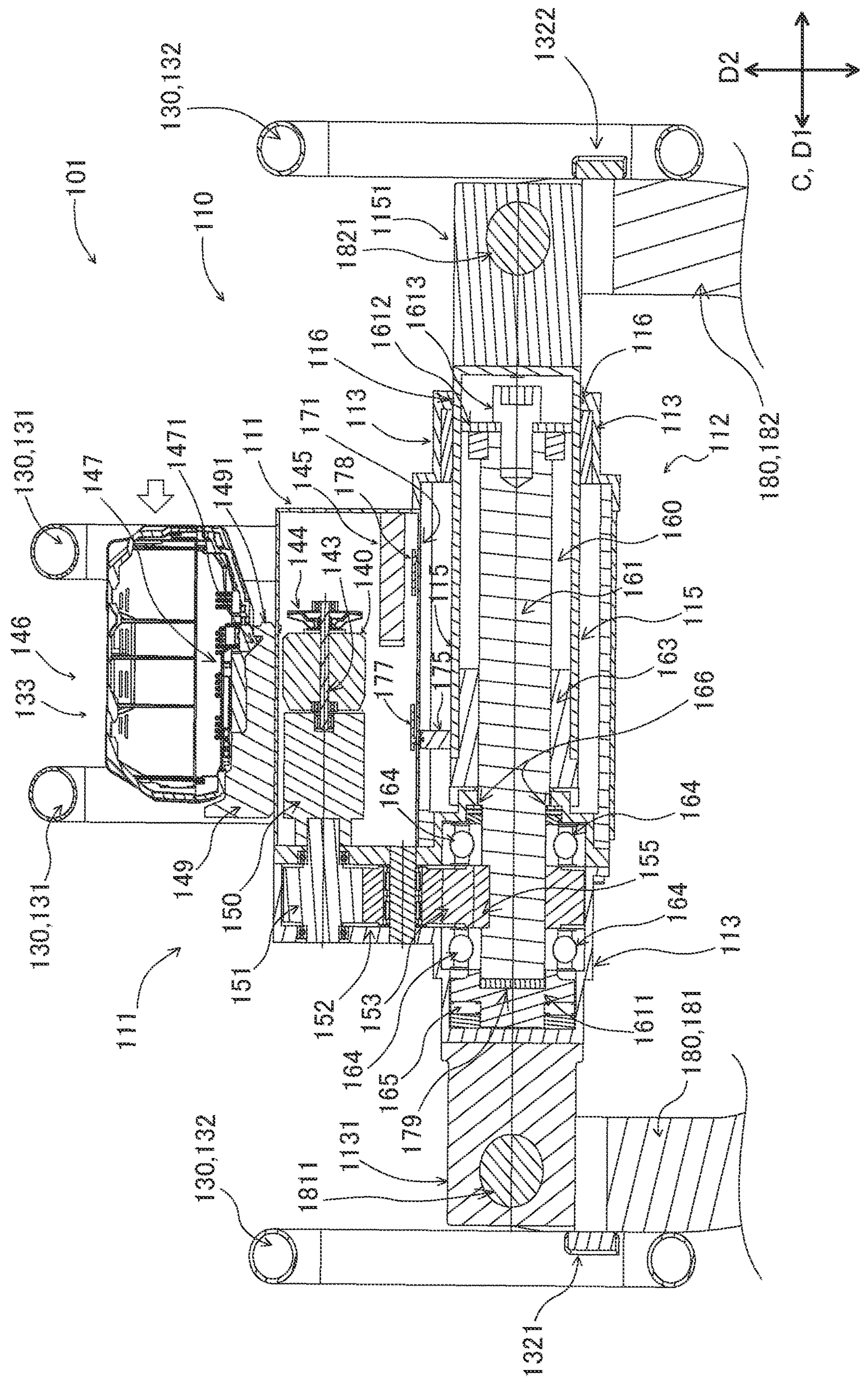
FIG. 3 is a partly cross-sectional view showing the structure of the upper region of the stone material crushing tool.

In this embodiment, for the sake of convenience, the width direction of the stone material crushing tool 101 is defined as first direction D1 (right and left side on the paper in FIG. 1 to FIG. 3), the upper-lower direction intersecting the width direction is defined as second direction D2 (upper and lower side on the paper in FIG. 1 to FIG. 3).
Note that the first direction D1 coincides with stone material clamping direction C which will be explained later.

As to “stone material” according to this embodiment, a concrete, a natural stone, an artificial stone and so on can be embraced in a broad manner.

(Exterior Structure)

As shown in FIG. 1, the stone material crushing tool 101, as its exterior, comprises a housing 110, a handle 130 and a crushing member 180.

(Schematic Structure of the Housing 110)

The housing 110 comprises a first housing 111 and a second housing 112.

(First housing 111)

While the first housing 111 houses a part of a motor 140 as shown in FIG. 1 and a mechanism which receives output of the motor 140 and so on, the greater detail thereof will be explained later. An operating member 135 for a manual input by a user to activate the stone material crushing tool 101 is disposed adjacent to the first housing 111. An operating member 135 is provided with an operating switch for the manual input and an indicating member (details thereof are abbreviated for the sake of convenience).

(Second Housing 112)

As shown in FIG. 1, the second housing 112 is provided at a lower adjacent region of the first housing 111 in a connecting manner with the first housing 111. While the second housing 112 mainly houses a motion converting mechanism 160 as shown in FIG. 3 in the inside, details thereof will be explained later.

The second housing 112 comprises a second housing base portion 113 connected to the first housing 111 in a relatively non-movable manner and a second housing movable portion 115 relatively movable to the second housing base portion 113 in the first direction D1.

Each of the second housing base portion 113 and the second housing movable portion 115 respectively comprises crushing member connecting portions 1131, 1151 to a crushing member 180 (it will be explained later) at each end region in an integral manner.

(Structure of the Handle 130)

As shown in FIG. 1, the handle 130 comprises a first handle 131 and a second handle 132 provided as a pair structure. The first handle 131, 131 are respectively connected with the first housing 111. Further, the second handle 132, 132 are respectively fixedly connected with a first arm 181 and a second arm 182 of the crushing member 180 as will be explained later.

At a first handle adjacent region 133 on the upper region of the first housing 111 between the pair of the first handle 131, 131, a battery 146 for supplying electricity are detachably attached to the first housing 111.

(Structure of the Crushing Member 180)

The crushing member 180 is mainly provided with the first arm 181 and the second arm 182 as a pair structure. The upper end region of each of the first arm 181 and the second arm 182 is respectably formed in a bifurcated manner and fittingly connected with the crushing member connecting portion 1131, 1151 of the second housing 112.

And each of the first arm 181 and the second arm 182 is relatively rotatably connected with the crushing member connecting portion 1131, 1151 via a first connecting link 1811, 1821.

Each of the first arm 181 and the second arm 182 comprises stone material clamping portions 1813, 1823 at the lower front side with tip end projecting portions 1815, 1825 and intermediate projecting portions 1816, 1826, respectively.

(Definition of Crushing)

Terminology "crushing" by the crushing member 180 may comprises aspects of; pressurizing the stone material to be crushed, cutting, crushing by shear force and so on. For example, if the tip end projecting portions 1815, 1825 or the intermediate projecting portions 1816, 1826 are used, complex crushing action takes place with cutting, shear and pressurizing. Otherwise, if a region other than the tip end projecting portions 1815, 1825 or the intermediate projecting portions 1816, 1826 are used, crushing action takes place with pressurizing.

Further, as the degree of "crushing", it may comprise aspects of; perfect crushing in which the stone material is broken to be separated, broken but not separated such that the crushing member 180 penetrates the stone material.

(Connection of the First Arm 181 with the Second Arm 182)

As shown in FIG. 1, the first arm 181 with the second arm 182 are respectively rotatably connected with an arm mutually connecting portion 183 having a pair of plate-like member via second connecting links 1812, 1822 such that the first arm 181 with the second arm 182 are relatively movably and integrally connected to each other.

Further, as shown in FIG. 2 which is a front cross-sectional view of the stone material crushing tool 101, the first arm 181 and the second arm 182 comprise engaging portions 1814, 1824 provided with a concave portion and a convex portion engaging to each other.

Moreover, the pair of the second handle 132 are, as shown in FIG. 2, respectively fixedly connected to the first arm 181 and the second arm 182 via second handle fixing members 1321, 1322.

(Inner Structure of the Stone Material Crushing Tool 101)

Next, mainly in reference to FIG. 3, inner structure at the upper region of the stone material crushing tool 101 is explained in detail.

(Battery 146)

The battery 146 comprises a battery terminal 147. The battery 146 moves substantially in the first direction D1 (left side on the paper in FIG. 3 according to this embodiment) and the battery 146 is slidably mounted to a battery mounting portion 149 provided at the upper region of the first housing 111 in an attachable and detachable manner. In a case that the battery 146 is mounted, an engaging projection 1471 of the battery 146 and an engaging projection 1491 of the battery mounting portion 149 are mutually engaged such that the battery 146 is prevented from unintentionally dropping off.

(First Housing 111)

In the first housing 111 which defines the component element of the housing 110, a motor 140 having an output shaft 143 and a cooling fan 144, a controller 145 for a drive control of the motor 140, a planetary gear deceleration mechanism 150 to receive the rotational output of the motor 140, a first gear 151 to receive the rotational output of the planetary gear deceleration mechanism 150, and a part of an idling gear 152 to receive the rotational output of the first gear 151 are respectively housed. The motor 140 is disposed such that the longitudinal axis of the output shaft 143 extends in the first direction D1, namely to be substantially parallel to the first direction D1.

According to this embodiment, a brushless motor is adopted as the motor 140. The brushless motor can provide with relatively high output with relatively compact body without having a brush for supply electricity. Thus, the brushless motor may preferably be utilized to the stone material crushing tool 101. Further, because the planetary gear deceleration mechanism 150 is adopted to a power transmitting path from the motor 140, device structure for the power transmission can become compact.

Note that, as to the structure as itself of each of the motor 140, the planetary gear deceleration mechanism 150 and the controller 145 pertains to a known art. Therefore, explanation of the mechanical structure is abbreviated and will be schematically shown in FIG. 3.

(The Motion Converting Mechanism 160 in the Second Housing 112)

A ball screw mechanism as the motion converting mechanism 160 mainly provided with a ball screw shaft 161 and a nut 163 is housed in the second housing 112. The ball screw shaft 161 is disposed such that the longitudinal axis thereof extends in the first direction D1. In other words, the ball screw shaft 161 is disposed to be substantially parallel to the first direction D1. The ball screw mechanism having the ball screw shaft 161 and the nut 163 is an example of the screw feed mechanism according to the invention. Note that the screwing structure of the ball screw shaft 161 and the nut 163 as itself pertains to a known art. Therefore, explanation of the mechanical structure is abbreviated and will be schematically shown in FIG. 3.

(The Ball Screw Shaft 161 and the Load Cell 179)

At each end portion of the ball screw shaft 161, a first cap 1611 and a second cap 1612 are respectively disposed. A load cell 179 is disposed between the first cap 1611 and the ball screw shaft 161. A fixing screw 1613 is provided at the second cap 1612.

The load cell 179 is arranged to detect axial force applied to the ball screw shaft 161 in the first direction D1 and to send the detecting result to the controller 145. As a result, progress of the stone material crushing operation can be detected. For example, an increase of the axial force enables the starting timing of the stone material crushing operation and a drastic decrease of the axial force enables the stone material crushing timing. Note that, as to the progress decision of the stone material crushing operation, changing amount of the axial force, differential value of the axial force, the integral value of the axial force or any combination thereof may preferably be adopted other than the axial force.

The ball screw shaft 161 is held to the second housing base portion 113 via the radial bearing 164 such that the ball screw shaft 161 is rotatable around the first direction D1.

Further, the ball screw shaft 161 is held by the second housing base portion 113 via the first thrust bearing 165 and the second thrust bearing 166 with respect to the first direction D1 such that the ball screw shaft 161 receives axial force to the first direction D1.

A second gear 153 is secured to the end region of the ball screw shaft 161 via a connecting key 155 disposed at a key groove. The second gear 153 is connected with the idling gear 152. Therefore, rotational output from the motor 140 is mechanically transmitted to the ball screw shaft 161 via the planetary gear deceleration mechanism 150, the first gear 151, the idling gear 152 and the second gear 153. As a result, the ball screw shaft 161 is rotatably driven around the first direction D1.

According to this embodiment, the rotational output of the motor 140 is transmitted to the ball screw shaft 161 as appropriately decelerated by the planetary gear deceleration mechanism 150, the first gear 151 and the second gear 153. Note that the second gear 153 is secured to the ball screw shaft 161 as being held at both ends at the region where being sandwiched by the radial bearing 164. Because region to transmit driving force can be held around by both ends, generation of unintentional vibration and couple force can effectively be prevented.

(Nut 163)

Further, the nut 163 is screwed to the ball screw shaft 161 and fixedly connected to the second housing movable portion 115. Each of the second housing base portion 113 and the second housing movable portion 115 is connected relatively movably in the first direction D1 and relatively non-rotatably around the first direction D1. Therefore, if the ball screw shaft 161 rotates around the first direction D1, the nut 163 is arranged to be able to move in the first direction D1 as prevented from rotating around the first direction D1 by the screwing function with the ball screw shaft 161.

(Position Detecting Structure of the Nut 163)

A nut interlocking detector 175 is fixedly disposed at the second housing movable portion 115 to which the nut 163 is fixedly connected. On the other hand, the first position detecting portion 177 and the second position detecting portion 178 are disposed along the first direction D1 at the first housing 111 (at the upper region of the second housing base portion 113) so as to correspond to the nut interlocking detector 175. The nut interlocking detector 175, the first position detecting portion 177 and the second position detecting portion 178 provides with the nut position detecting mechanism 171 as is typically be arranged by combination of a magnet and a magnet sensor. According to this embodiment, a magnet is adopted to the nut interlocking detector 175 and a magnet sensor is adopted to the first position detecting portion 177 and the second position detecting portion 178.

If the nut interlocking detector comes close to each of the first position detecting portion 177 and the second position detecting portion 178, each of a first position detecting signal and a second position detecting signal is send to the controller 145. As will be explained later, the first position detecting portion 177 corresponds to an initial state (initial position) before the operation by the stone material crushing tool 101 and the second position detecting portion 178 corresponds to the maximum movable position of the second housing movable portion 115 (namely, the nut 163).

Note that such position detection can be made, for example, to the motor 140 such that predetermined reference position is set and detection is made based on the number of rotations of the motor 140 (historical data as to how many numbers of rotations the motor 140 rotates from the predetermined reference position).

(Connecting Structure Between the Second Housing 112 and the Crushing Member 180)

The end region of the second housing base portion 113 (left end region in FIG. 3) provides with the crushing member connecting portion 1131 at the second housing 112. A first arm 181 of the crushing member 180 is rotatably connected to the crushing member connecting portion 1131 via a first connecting link 1811. On the other hand, the second housing movable portion 115 defines a crushing member connecting portion 1151 at its end region (right end region in FIG. 2). The second arm 182 of the crushing member 180 is rotatably connected to the crushing member connecting portion 1151 via the first connecting link 1821.

Next, operating aspect of the stone material crushing tool 101 according to this embodiment is explained.

(Initial State)

Initial state before the operation by the stone material crushing tool 101 is shown from FIG. 1 to FIG. 3. In this state, the user transports the stone material crushing tool 101 by holing the handle 130 and then, contacts the stone material clamping portions 1813, 1823 of the crushing member 180 with the stone material W (as schematically shown with broken line in FIG. 2). FIG. 2 shows the state that tip end projecting portions 1815, 1825 are contacted with crushing planned region of the stone material W. Note that, in accordance with the working environment or the material and/or the strength of the stone material W, the user can contact with the stone material clamping portions 1813, 1823 by selecting intermediate projecting portions 1816, 1826 or any other regions In this initial state, the first handle 131 and the second handle 132 are respectively parallelly extend in the second direction D2.

As shown in FIG. 3, the nut 163 in the initial state is located at a predetermined region (adjacent region to the ball bearing 164 or the second thrust bearing) of the ball screw shaft 161. In this state, the nut interlocking detector 175 is disposed at a position to face with the first position detecting portion 177. And then, at the first position detecting portion 177, the nut interlocking detector 175 is detected and a first position detecting portion is transmitted to the controller 145.

When the user manually turns on the drive switch disposed at the operating member 135 as shown in FIG. 1, the controller 145 puts the motor 140 in a driving state as is shown in FIG. 3. Because brushless motor is adopted as the motor 140, the motor 140 is driven by the PWM control of the controller 145. According to this embodiment, the driving state of the motor 140 from the initial state is defined as a "forward drive".

The rotating movement of the motor 140 is transmitted to the ball screw shat 161 via the output shaft 143, the planetary gear deceleration mechanism 150, the first gear 152, the idling gear 153 and the second gear 153 and then, the ball screw shaft 161 is rotated around the first direction D1. As a result, the nut 163 screwed to the ball screw shaft 161 is moved in the first direction D1 without being rotated (right side in FIG. 3). When the nut 163 is moved, the second housing movable portion 115 fixedly integrated with the nut 163 is relatively moved to the second housing base portion 113. Same with this, the nut interlocking detector 175 integrated with the nut 163 is also moved integrally with the nut 163.

Note that a sealing member 116 (rubber 0 ring and so on) is disposed to intervene between the second housing base portion 113 and the second housing movable portion 115 and an external communication of the second housing 112 to the outside is maintained. Accordingly, when the second housing movable member 115 is moved, dust and so on is effectively prevented from going into the second housing 112 and lubricant is prevented from going out from the second housing 112 to the outside.

(Second Position as the Maximum Movable Region; Operation of the Crushing Member 180)

Figure 4:
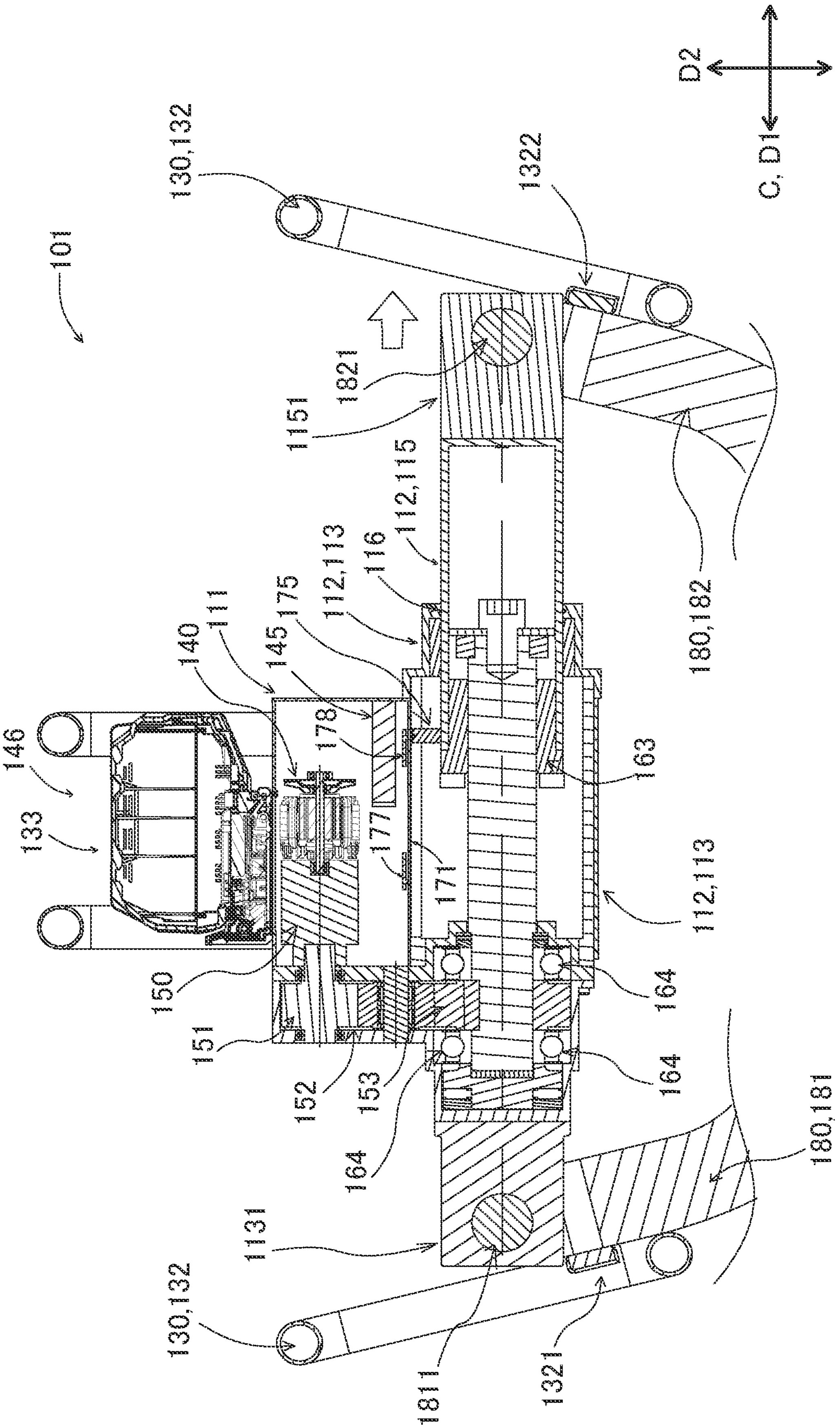
FIG. 4 is a partly cross-sectional view showing the operation of the stone material crushing tool.

As shown in FIG. 4, the movement of the nut 163 is capable till the nut interlocking detector 175 is detected by the second position detecting portion 178. In other words, the second position detecting portion 178 defines the maximum movable region of the nut 163. Further, the movable stroke of the nut 163 is defined by the distance between the first position detecting portion 177 and the second position detecting portion 178 in the first direction D1.

As explained above, the second arm 182 is rotatably connected with crushing member connecting portion 1151 via the first connecting link 1821. Therefore, as shown in FIG. 4, the nut 163 moves in the first direction D1 and then, the second arm 182 relatively rotates to the second housing movable portion 115. Further, the second handle 132 fixedly connected with the second arm 182 (the right sided second handle 132 in FIG. 4) also rotates.

(Rotational Movement of the First Arm 181 and the Second Arm 182)

Figure 5:
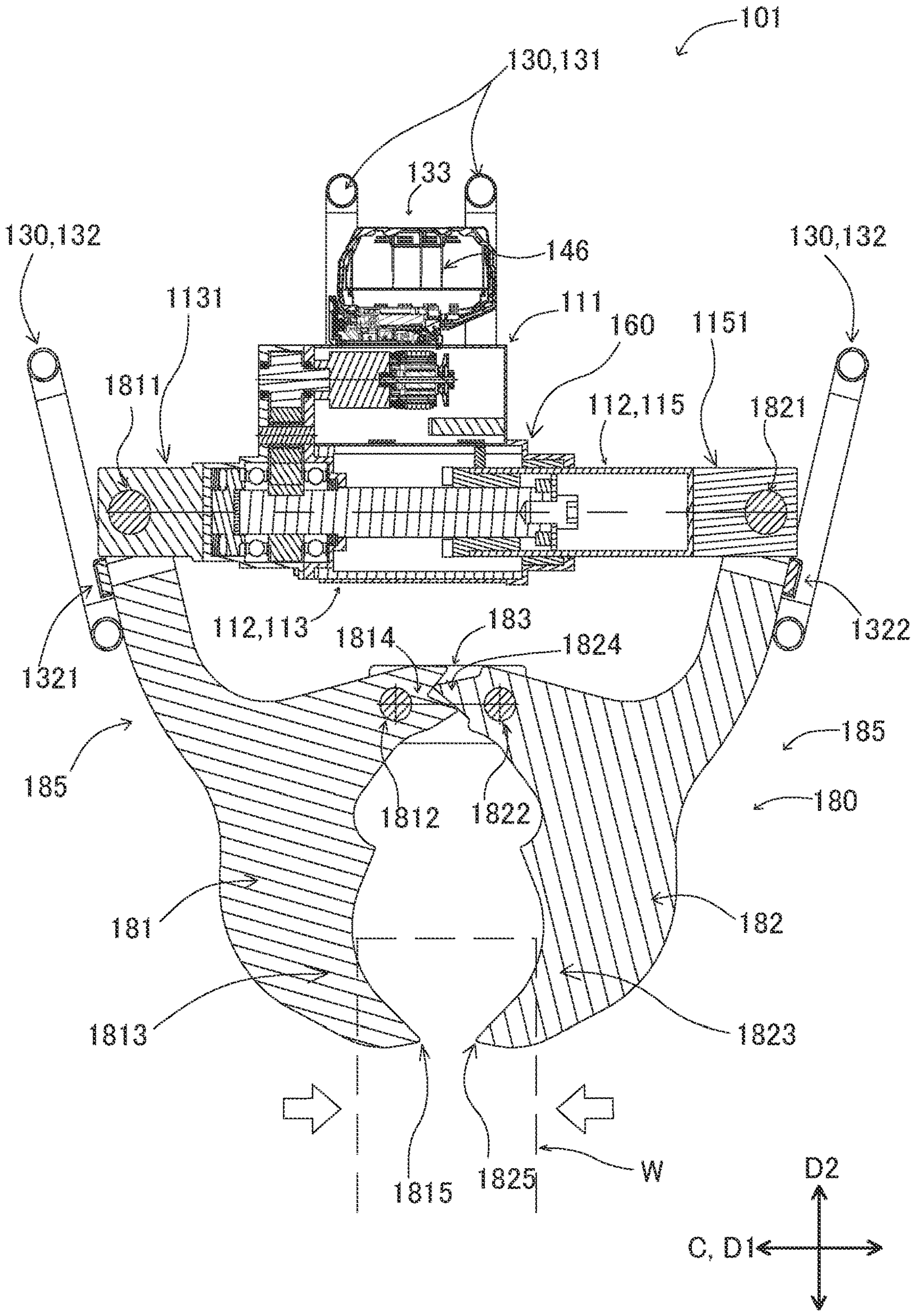
FIG. 5 is a front cross-sectional view showing the operation of the stone material crushing tool.

As explained above, the first arm 181 and the second arm 182 are connected at the arm mutually connecting portion 183 via the second connecting links 1812, 1822 and convex-concaved engaging portions 1814, 1824 (see FIG. 2). As a result, as shown in FIG. 5, when the second arm 182 relatively rotates to the second housing movable portion 115, the first arm 181 relatively rotates to the second housing base portion 113 around the first connecting link 1811 in relation to the rotating movement of the second arm 182. Further, the second handle 132 fixedly connected to the first arm 181 (the left sided second handle 132 from FIG. 3 to FIG. 5) also rotates together with the first arm 181. Namely, the first connecting links 1811, 1821, the second connecting links 1812, 1822, the arm mutually connecting portion 183 and the convex-concaved engaging portions 1814, 1824 define the rotating movement converting mechanism for the first arm 181 and the second arm 182, as well as define also the automatic interlocking mechanism with respect to the rotating movement of the second handles 132, 132.

(Torque Increasing Mechanism)

Further, as shown in FIG. 2 and FIG. 5, with respect to the distance between the first connecting links 1811, 1821 and the second connecting links 1812, 1822, the distance between the second connecting link 1812, 1822 and the stone material clamping portion 1813, 1823 (In this embodiment, tip end projecting portions 1815, 1825 are used for crushing the stone material, as one example), and the distance between the first connecting link 1811, 1821 and the stone material clamping portion 1813, 1823, it is arranged such that the output of the rotation by the rotating movement converting mechanism 185 is larger than the output by the motion converting mechanism 160 by means of a principle of leverage.

(Stone Material Crushing Operation)

In this state, as is shown in FIG. 5, the first arm 181 and the second arm 182 approach closely to each other in the first direction D1 and then, the stone material clamping portions 1813, 1823 crushes the stone material W which is clamped (In this embodiment, by the tip end projecting portions 1815, 1825).

In this embodiment, the stone material crushing direction C coincides with the first direction D1. In other words, the stone material crushing direction C is arranged to be substantially parallel to the first direction D1

(Return Movement)

As shown in FIG. 4, when the approach of the nut interlocking detector 175 is detected by the second position detecting portion 178, the controller 145 stops the drive (forward drive) of the motor 140 and then, the controller 145 reversely drives the motor 140 to have the nut 163 move to the initial position.

Then, when the first position detecting portion 177 detects the approach of the nut interlocking detector 175, the controller 145 stops the revere drive of the motor 140 (the initial position is shown in FIG. 1 to FIG. 3), as returned to the initial position. As a result, the working stroke of the stone material crushing tool 101 is completed.

Note that, as to the return movement, it can be adopted such that the return movement is automatically conducted, for example, the user stops the operation (for example, the cancellation of the pushing operation) of the operating switch (for example, a trigger) at the operating member 135 (see FIG. 1).

Otherwise, without conducting automatic return movement, it can be adopted to request a manual return operation by the user. As to the manual return operation, for example, exclusive switch (return switch) can be provided.

(Crushing Detection by the Load Cell 179: Operation Stroke Shortening Mechanism)

Further, according to this embodiment, the load cell 179 is arranged to monitor the axial force (see FIG. 3).

Specifically, when the stone material crushing operation is conducted, strong axial force in the first direction D1 is applied to the ball screw shaft 161 as one of the power transmitting paths from the motor 140 to the crushing member 180. The load cell 179 disposed at the end region of the ball screw shaft 161 between the first cap 1611 detects such axial force and transmit to the controller 145. When the stone material is crushed and the axial force applied to the ball screw shaft 161 is decreased (drastic decrease), the controller 145 determines that the stone crushing operation is completed and the controller 145 stops the drive of the motor 140 before the detection of the second position detector 178. And then, the controller 145 reversely drive the motor 140 to return to the initial position. Namely, the return movement to the initial position is completed by the detection of the approach of the nut interlocking detector 175 by the first position detecting portion 177.

By such construction, the completion of the stone material crushing operation can be detected by the axial force monitoring of the load cell 179 for the return movement to the initial position, before the second position detecting portion 178 detects the approach of the nut interlocking detector 175. Therefore, the working stroke can be shortened so as to contribute to the further refinement of the working environment. In other words, the load cell 179 provides with a working stroke shortening mechanism of the stone material crushing tool 101.

(Selection of the Operation Stroke (1): Manual Selection by the User)

As to the above explained aspects as to whether:

return movement is done by the detection by the second position detecting portion 178 of the approach of the nut interlocking detector 175 (Working stroke based on the maximum movable range), or return movement is done before the detection by the second position detecting portion 178, by detecting completion of crushing the stone material based on a change of the axial force by the load cell 179 (Shortened working stroke by the initial position return movement at the completion of the stone material crushing);

it may be arranged such that the user may selectively switch it by means of the operating member 135 as explained above.

(Selection of the Operation Stroke (2) Default Standardization of the Detection by the Load Cell 179)

Otherwise, it may be arranged such that a mode is usually standardized (as default) to conduct the initial position return movement from the detection position at which the completion of crushing the stone material is detected based on the axial force change by the load cell 179. In addition to that, while the detection of the nut interlocking detector 185 by the second position detecting portion 178 is defined as "allowable maximum movable range", it may be arranged to be just in case to support the malfunction of the detection by the load cell 179. By adopting such construction, the usual working stroke can be shortened and also the safety margin of the detection malfunction can be kept.

(Change of the Position Detecting Point of the Nut 163)

As to the above explained first position detecting portion 177 and the second position detecting portion 178, disposition of any one of or both of these detecting portions at the first housing 111 can be changed with respect to the first direction D1.

When the disposition of the first position detecting portion 177 to the first housing 111 is changed with respect to the first direction D1, the first position as the initial position is appropriately changed to be adjusted.

Further, when the disposition of the second position detecting portion 178 to the first housing 111 is changed with respect to the first direction D1, the second position as the maximum movable position is appropriately changed to be adjusted.

Moreover, as to the method of change, for example, it can be adopted from an aspect such that the user can manually changer disposition, or an aspect such that the disposition is automatically changed in accordance with the detecting result of nature of the stone material (for example, size, material, hardness).

For example, if it is changed such that the separating distance between the first position detecting portion 177 and the second position detecting portion 178 becomes smaller, stroke distance from the initial position to the maximum movable range can become shorter.

Further, for example, by shifting the first position detecting portion 177 from the original initial position to the moving direction of the nut 163, adjustment can be made such that the initial clearance of the stone material clamping portion 1813, 1823 can become larger.

(Advantage to Set the Ball Screw Shaft 161 as the Drive Side and the Nut 163 as the Driven Side)

In the motion converting mechanism 160 according to this embodiment, as explained above, the ball screw shaft 161 is driven to rotate by the motor 140 and the nut 163 is driven to linearly move in the first direction D1 by the ball screw shaft 161. In other words, with respect to the first direction D1, the nut 163 as the driven-side component moves such that the nut 163 moves within the range between both ends of the ball screw shaft 161 as the driving-side member (the nut 163 moves to overlap with the ball screw shaft 161 in the first direction D1).

Accordingly, it is not necessarily required to newly provide large space for the drive-side member. To the contrary, it is enough to design the housing space (namely the second housing) in reference to the length of the ball screw shaft 161 which is an elongated body.

As a result, the width of the stone material crushing tool 101 can be prevented from becoming longer for the movable member and thus, dust protection and so on for the housing 110 can be easily done.

(Extending Direction of the Output Shaft 143, the Ball Screw Shaft 161 and the Stone Material Clamping Direction C)

According to this embodiment, as explained above, the extending direction of the output shaft 143 of the motor 140, the extending direction of the ball screw shaft 161 at the motion converting mechanism 160 (namely the moving direction of the nut 163) and the stone material clamping direction C by the first arm 181 and the second arm 182 at the crushing member 180 are arranged to be parallel, respectively (see FIG. 2, FIG. 3, FIG. 5 and so on). Note that the stone material clamping direction C is defined as an approximate linear movement to the tangential direction of the stone material clamping member 1813, 1823.

By such parallel disposition, it becomes possible to concentrate the elongated members and movements to the width direction of the tool. As a result, in comparison with the case that these members are disposed in a parallel manner, the device construction can become compact.

Note that, if the output shaft 143 and the ball screw shaft 161 are disposed in parallel such that each of these members reversely rotates for example, vibration and couple force can be prevented from being generated.

(Protection of the Battery 146)

In this embodiment, as shown in FIG. 1 and so on, the battery 146 is disposed at the first handle adjacent region 133 at the upper portion of the first housing 111. This first handle adjacent region 133 is defined as a protection region surrounded by a pair of the first handle 131, 131. Therefore, any unintentional outer force is prohibited from being applied to the battery 146 and as a result, destroy of the battery 146 and/or the battery mounting portion can be prevented (see FIG. 3).

Note that the pair of the first handle 131, 131 are open-ended with respect to the sliding direction of the battery 146 as shown in FIG. 1 and FIG. 3. Therefore, both protection of the battery 146 and the sliding capability can be secured.

According to this embodiment, due to the above explained structure and operation, the stone material crushing tool 101 which can prevent complication of the working environment is provided.

EXPLANATION OF REFERENCES

101 Stone material crushing tool
110 Housing
111 First housing
112 Second housing
113 Second housing base portion
115 Second housing movable portion
1131, 1151 Crushing member connecting portion
116 Sealing member
130 Handle
131 First handle
132 Second handle
133 First handle adjacent region
135 Operating member
1321, 1321 Second handle fixing member
140 Motor
143 Output shaft
144 Cooling fan
145 Controller
146 Battery
147 Battery terminal
149 Battery mounting portion
1471, 1491 Engaging projection
150 Planetary gear deceleration mechanism
151 First gear
152 Idling gear
153 Second Gear
155 Connecting key
160 Motion converting mechanism
161 Ball screw shaft (Screw portion)
1611 First cap
1612 Second cap
1613 Fixing screw
163 Nut (Nut portion).
164 Radial bearing
165 First thrust bearing
166 Second thrust bearing
171 Nut position detecting mechanism
175 Nut interlocking detector
177 First position detecting portion,
178 Second position detecting portion
179 Load Cell
180 Crushing member
181 First arm
182 Second arm
1811, 1821 First connecting link
1812, 1822 Second connecting link
1813, 1823 Stone material clamping portion
1814, 1824 Engaging portion
1815, 1825 Tip end projecting portion
1816, 1826 Intermediate projecting portion
183 Arm mutually connecting portion
185 Rotating movement converting mechanism (Handle interlocking mechanism)
D1 First direction (Width direction)
D2 Second direction (Upper lower direction)
C Stone material clamping direction
W Stone material

The invention claimed is:

1. An electrically-driven stone material crushing tool comprising:

a motor provided with an output shaft;

a motion converting mechanism which converts rotating output from the output shaft to linear movement;

a crushing member which clamps a stone material to be crushed by means of the linear movement;

a position detecting member that detects a nut interlocking detector at a first position and a second position;

a controller which controls the motor based on a detected position of the nut interlocking detector; and a crushing detecting member that detects completion of a stone crushing operation of the stone material, wherein in response to a detected completion of the stone crushing operation, and before the nut interlocking detector reaches the second position from the first position, the controller controls the motor in a direction to return the nut interlocking detector to the first position, and wherein in response to a detected non-completion of the stone crushing operation, and the nut interlocking detector reaches the second position from the first position, the controller controls the motor in the direction to return the nut interlocking detector to the first position.

2. The electrically-driven stone material crushing tool as described in claim 1, wherein the motion converting mechanism is defined by a screw feed mechanism comprising a screw portion, a nut portion screwed to the screw portion.

3. The electrically-driven stone material crushing tool as described in claim 2, wherein the rotating output of the output shaft causes the nut portion to linearly move along the screw portion based on a rotating movement of the screw portion.

4. The electrically-driven stone material crushing tool as described in claim 1, wherein the crushing member comprises a stone material clamping portion which clamps the stone material in a predetermined clamping direction such that the linear movement of the motion converting mechanism coincides with the clamping direction.

5. The electrically-driven stone material crushing tool as described in claim 4, wherein an extending direction of the output shaft coincides with the clamping direction.

6. The electrically-driven stone material crushing tool as described in claim 1, further comprising a rotating movement converting mechanism which converts the linear movement of the motion converting mechanism to a rotating movement, wherein the crushing member crushes the stone material by the rotating movement of the rotating movement converting mechanism.

7. The electrically-driven stone material crushing tool as described claim 1, wherein a disposition of at least one of the first position and the second position is changeable.

8. The electrically-driven stone material crushing tool as described in claim 1, wherein a planetary gear deceleration mechanism is disposed to intervene between the output shaft and the motion converting mechanism.

9. The electrically-driven stone material crushing tool as described in claim 1, further comprising a handle to be held by a user and a battery to drive the motor, wherein the battery is disposed in a handle adjacent region and the handle concurrently serves as a battery guard.

* * * * *